United States Patent
Ostvik et al.

(10) Patent No.: US 11,541,362 B2
(45) Date of Patent: Jan. 3, 2023

(54) AGITATOR ROTORS AND AGITATOR SYSTEMS FOR SOLIDS

(71) Applicant: Ecogensus LLC, Hartford, CT (US)

(72) Inventors: Bjornulf Ostvik, Hartford, CT (US); Michael Costen, Milford, CT (US)

(73) Assignee: Ecogensus LLC, West Hartford, CT (US)

( * ) Notice: Subject to any disclaimer, the term of this patent is extended or adjusted under 35 U.S.C. 154(b) by 0 days.

(21) Appl. No.: 17/079,065

(22) Filed: Oct. 23, 2020

(65) Prior Publication Data

US 2021/0121837 A1    Apr. 29, 2021

Related U.S. Application Data

(60) Provisional application No. 62/926,133, filed on Oct. 25, 2019.

(51) Int. Cl.
| | |
|---|---|
| *B22C 5/00* | (2006.01) |
| *B01F 27/072* | (2022.01) |
| *B01F 27/051* | (2022.01) |
| *B01F 27/07* | (2022.01) |
| *B01F 27/09* | (2022.01) |

(Continued)

(52) U.S. Cl.
CPC ........ *B01F 27/0724* (2022.01); *B01F 27/051* (2022.01); *B01F 27/071* (2022.01); *B01F 27/092* (2022.01); *B01F 27/1123* (2022.01); *B01F 27/1125* (2022.01); *B01F 27/60* (2022.01)

(58) Field of Classification Search
CPC .............. B01F 27/1123; B01F 27/1125; B01F 2035/99; B01F 27/051; B01F 27/071; B01F 27/0724; B01F 27/0727; B01F 27/092; B01F 27/60; B01F 27/708; B01F 35/754551; B01F 35/95; B01J 19/20
See application file for complete search history.

(56) References Cited

U.S. PATENT DOCUMENTS

| | | | | |
|---|---|---|---|---|
| 4,194,925 A | * | 3/1980 | Holbrook | B01F 27/72 134/22.12 |
| 2015/0231800 A1 | * | 8/2015 | Martel | B29B 7/823 366/76.2 |
| 2017/0071215 A1 | * | 3/2017 | Hall | B01F 27/708 |

FOREIGN PATENT DOCUMENTS

| | | | | |
|---|---|---|---|---|
| DE | 202011107055 | | 1/2013 | |
| EP | 988888 A1 | * | 3/2000 | ........ B01F 15/00207 |

(Continued)

OTHER PUBLICATIONS

PE2E Search machine translation for "EP-988888-A1" (Year: 2000).*

(Continued)

*Primary Examiner* — Anshu Bhatia
*Assistant Examiner* — Gregory Y Huan
(74) *Attorney, Agent, or Firm* — Fish & Richardson P.C.

(57) ABSTRACT

An agitator rotor includes a shaft, rails, and a rod. The shaft defines a longitudinal axis. The rails extend radially from and are coupled to the shaft. The rails are separated from each other along a length of the shaft. Each rail includes a surface defining a non-zero angle with respect to the longitudinal axis of the shaft. The rod includes a first end coupled to a first one of the rails. The rod includes a second end coupled to a second one of the rails. A projection of the first end and the second end of the rod in a plane perpendicular to the longitudinal axis of the shaft defines a minor arc about a portion of the shaft.

15 Claims, 13 Drawing Sheets

(51) Int. Cl.
    *B01F 27/1123*    (2022.01)
    *B01F 27/1125*    (2022.01)
    *B01F 27/60*       (2022.01)

(56) References Cited

FOREIGN PATENT DOCUMENTS

| | | |
|---|---|---|
| JP | S56-152731 | 11/1981 |
| JP | 2001-259401 | 9/2001 |
| KR | 10-0806834 | 2/2008 |
| KR | 100806834 B1 * | 2/2008 |
| WO | WO-2017204633 A1 * 11/2017 | ............ A21C 1/065 |

OTHER PUBLICATIONS

Google machine translation for "KR100806834B1" (Year: 2008).*
PCT International Search Report and Written Opinion in International Appln. No. PCT/US2020/057118, dated Feb. 3, 2021, 16 pages.

\* cited by examiner

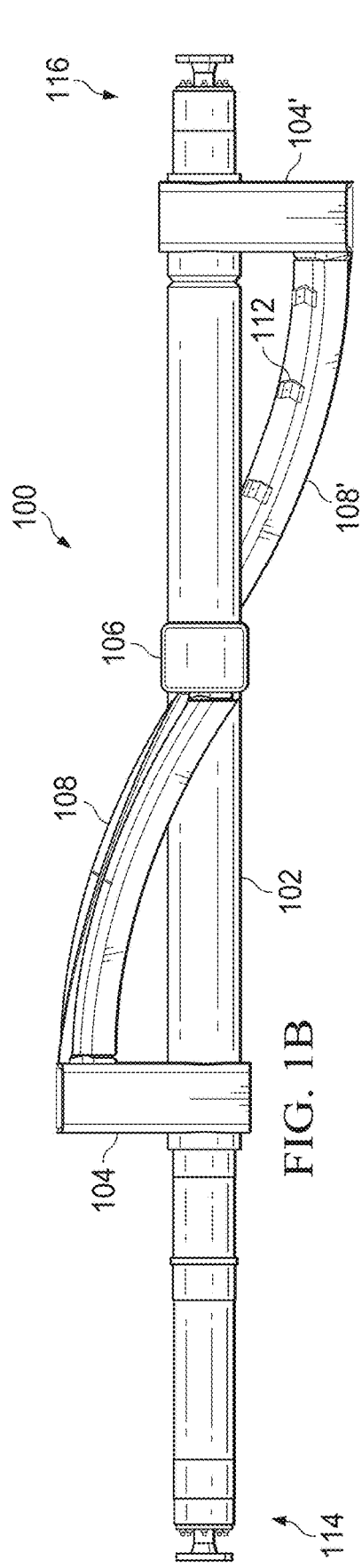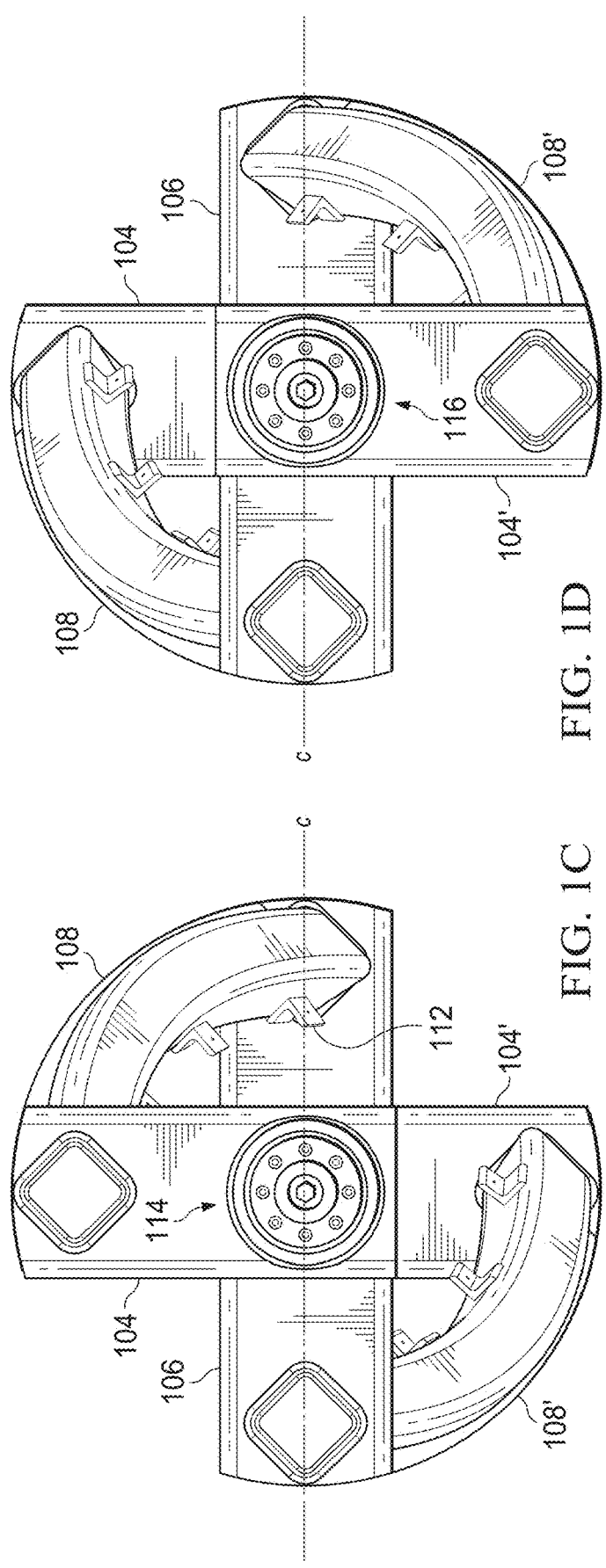

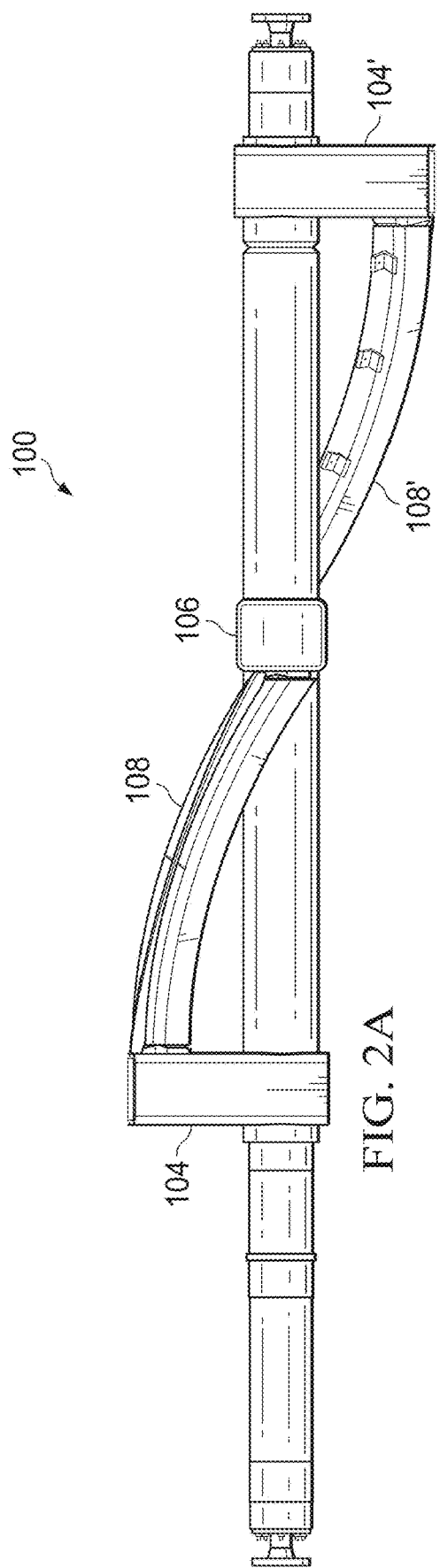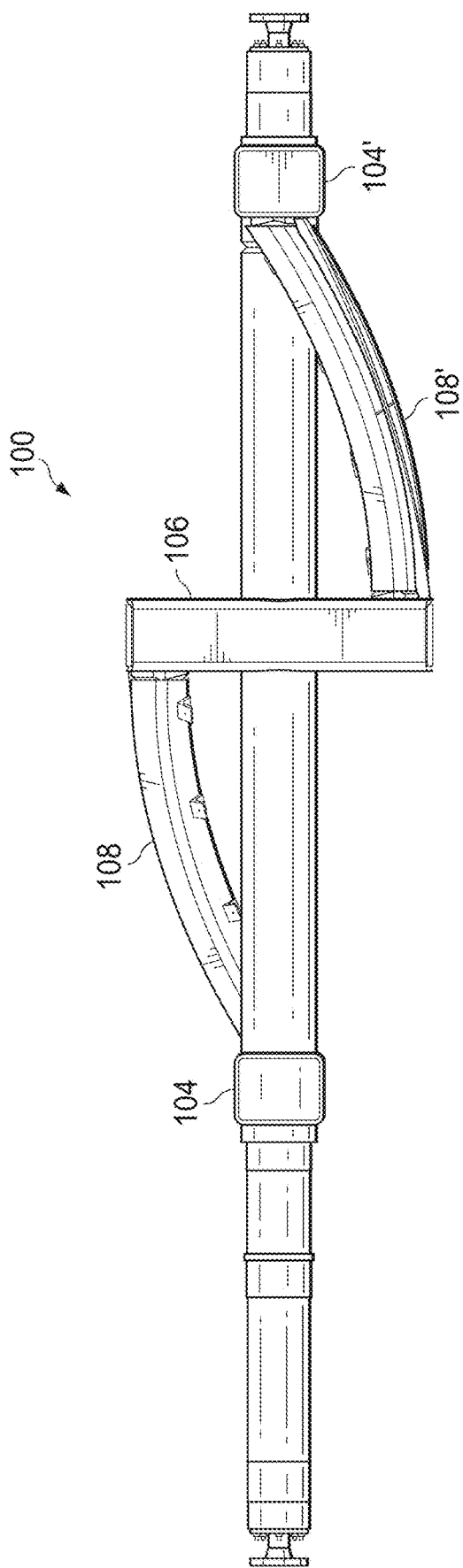

AGITATOR ROTORS AND AGITATOR SYSTEMS FOR SOLIDS

CROSS-REFERENCE TO RELATED APPLICATIONS

This application claims the benefit of priority to U.S. Provisional Application No. 62/926,133, filed on Oct. 25, 2019, and entitled "AGITATOR ROTORS AND AGITATION SYSTEMS FOR SOLIDS," the contents of which are hereby incorporated by reference.

TECHNICAL FIELD

This disclosure relates to agitator rotors and agitator systems for mixing solid components in a vessel.

BACKGROUND

It can be difficult to achieve desired mixing of a variety of solid components having different sizes, shapes, and densities and formed of different materials. It can be even more difficult when a large quantity of solid components are mixed and the weight distribution of the components is non-uniform. In some cases, mixing blades, such as flat, fan-shaped components with a large surface area designed to mix solid components in a vessel, can be damaged or have impaired movement when in contact with heterogeneous mixtures or abrasive, or otherwise physically challenging solids mixtures.

SUMMARY

This specification describes agitator rotors and agitator systems for solids. In particular, this specification describes agitator rotors and agitator systems for process vessels for producing compositions, such as solid fuel compositions, having a desired homogeneity, density, or moisture content. The agitator rotors and agitator systems can facilitate production of a desired composition (e.g., a solid fuel composition) from feedstock materials (e.g., solid wastes and other wastes).

In a first general aspect, a rotor includes a shaft defining a longitudinal axis, rails extending radially from and coupled to the shaft, and a rod having a first end coupled to a first one of the rails and a second end coupled to a second one of the rails. The rails are separated from each other along a length of the shaft and each rail has a surface defining a non-zero angle with respect to the longitudinal axis of the shaft. A projection of the first end and the second end of the rod in a plane perpendicular to the longitudinal axis of the shaft define a minor arc about a portion of the shaft.

Implementations of the first general aspect include one or more of the following features.

The surface of each rail is generally perpendicular to the longitudinal axis of the shaft. Each rail defines a central axis perpendicular to the longitudinal axis of the shaft. The central axis of the first one of the rails is generally perpendicular to the central axis of the second one of the rails. The minor arc is about a 90° arc. The rod can be hollow. A cross-section of the rod in a plane perpendicular to the longitudinal axis of the shaft is typically polygonal. In some cases, the cross-section of the rod in a plane perpendicular to the longitudinal axis of the shaft is rectangular. In certain cases, the cross-section of the rod in a plane perpendicular to the longitudinal axis of the shaft is square. The cross-section of the rod in a plane perpendicular to the longitudinal axis of the shaft is typically arcuate.

A fin (or fins) may be coupled to a surface of the rod. The fin (or fins) typically extends radially from the surface of the fin (or fins) is coupled to an outer surface or an inner surface of the rod. In some cases, a first one of the fins is coupled to an outer surface of the rod and a second one of the fins is coupled to an inner surface of the rod.

An additional rod having a first end may be coupled to a third one of the rails and a second end coupled to a fourth one of the rails. An additional rod having a first end may be coupled a third one of the rails and a second end coupled to the second one of the rails. The second end of the rod and the second end of the additional rod are coupled to the second one of the rails on opposing sides of a perimeter of the shaft in a plane perpendicular to the longitudinal axis of the shaft. The first end of the rod and the first end of the additional rod are coupled to the first one of the rails and the third one of the rails, respectively, on opposing sides of a perimeter of the shaft in a plane perpendicular to the longitudinal axis of the shaft.

The shaft, the rails, the rod, or any combination of these may be at least partially hollow, such that a heating medium (e.g., hot oil) can flow through such components. The rotor can include an inner rod that is hollow and disposed within at least a portion of the rod. A first void space between the inner rod and the rod may define a first annulus. The heating medium can flow through the first annulus. The rotor can include a second inner rod that is disposed within the shaft. The second inner rod extends across a portion of the shaft between the rails. A second void space between the second inner rod and the shaft may define a second annulus. The heating medium can flow through the second annulus.

In a second general aspect, a rotor system includes a first rotor of the first general aspect and a second rotor of the first general aspect.

Implementations of the second general aspect may include one or more of the following features.

The shaft of the first rotor and the shaft of the second rotor are in a fixed spatial relationship to each other. The first rotor and the second rotor are typically configured to rotate in opposite directions. The second one of the rails of the first rotor and the second one of the rails of the second rotor can be aligned in a plane perpendicular to the longitudinal axis of the shaft of the first rotor and the longitudinal axis of the shaft of the second rotor.

In a third general aspect, a process vessel includes the rotor system of the second general aspect. The rails and the rod of the first rotor and the rails and the rod of the second rotor are arranged in a cavity in the process vessel, each rotor configured to rotate about the shaft defined by the longitudinal axis of the rotor.

Implementations of the third general aspect may include one or more of the following features.

The shaft of the first rotor and the shaft of the second rotor typically extend through a wall of the process vessel. The rod of the first rotor and the rod of the second rotor can be sized and arranged to achieve a specified clearance with respect to a surface of the process vessel defining the cavity. In some cases, the first rotor and the second rotor are configured to mix and advance solid components in the cavity from a first end of the process vessel to a second end of the process vessel. In certain cases, the rotors are offset from a center of the cavity.

A fourth general aspect includes adding solid components into a process vessel and rotating at least one rotor to mix the solid components within the process vessel. The at least one rotor includes a shaft, rails, and a rod. The shaft defines a longitudinal axis. The rails extend radially from and are coupled to the shaft. The rails are separated from each other along a length of the shaft. Each rail includes a surface defining a non-zero angle with respect to the longitudinal axis of the shaft. The rod includes a first end coupled to a first one of the rails. The rod includes a second end coupled to a second one of the rails. A projection of the first end and the second end of the rod in a plane that is perpendicular to the longitudinal axis of the shaft defines a minor arc about a portion of the shaft.

Implementations of the fourth general aspect may include one or more of the following features.

The at least one rotor can include an inner rod and a second inner rod. The inner rod is typically disposed within the rod. A first void space between the inner rod and the rod may define a first annulus. The second inner rod is disposed within the shaft. The second inner rod extends across a portion of the shaft between the rails. A second void space between the second inner rod and the shaft may define a second annulus. While rotating the at least one rotor, a heating medium (e.g., hot oil) may be flowed through the at least one rotor.

Flowing the heating medium through the at least one rotor can include flowing the heating medium into the shaft. Flowing the heating medium through the at least one rotor can include flowing a first portion of the heating medium from the shaft into the first one of the rails. Flowing the heating medium through the at least one rotor can include flowing the first portion of the heating medium from the first one of the rails into the first annulus. Flowing the heating medium through the at least one rotor can include flowing the first portion of the heating medium from the first annulus into the second one of the rails. Flowing the heating medium through the at least one rotor can include flowing the first portion of the heating medium from the second one of the rails into the shaft. Flowing the heating medium through the at least one rotor can include flowing a second portion of the heating medium through the second annulus. Flowing the heating medium through the at least one rotor can include flowing the heating medium out of the shaft.

In a fifth general aspect, a rotor includes a first shaft, a second shaft, a first rail, a second rail, a third rail, a first rod, and a second rod. The first shaft defines a longitudinal axis. The second shaft is aligned with and spatially separated from the first shaft. The first rail extends radially from and is coupled to an end of the first shaft. The first rail includes a surface defining a non-zero angle with respect to the longitudinal axis. The second rail extends radially from and is coupled to an end of the second shaft. The second rail includes a surface defining a non-zero angle with respect to the longitudinal axis. The third rail is disposed between the first rail and the second rail. The third rail resides in a space between the first shaft and the second shaft. The third rail intersects with the longitudinal axis. The first rod includes a first end coupled to the first rail. The first rod includes a second end coupled to the third rail. A projection of the first end and the second end of the first rod in a plane perpendicular to the longitudinal axis defines a first minor arc. The second rod includes a first end coupled to the second rail. The second rod includes a second end coupled to the third rail. A projection of the first end and the second end of the second rod in a plane perpendicular to the longitudinal axis defines a second minor arc.

In one implementation of the fifth general aspect, the third rail extends along a plane that generally aligns with the first rod and the second rod.

The subject matter described in this specification can be implemented in particular embodiments, so as to realize one or more of the following advantages. For example, in various embodiments, the agitator rotors and agitator systems demonstrate a desired strength and durability for mixing a large quantity of solid components, including a large quantity of non-uniform solid components having an unpredictable weight distribution. The agitator rotors and agitator systems can facilitate thorough mixing of solids as well as movement of the solid mixture through a process vessel in a desired direction. The agitator rotors can be sized and shaped and the agitator systems can be implemented to minimize a distance between a surface of the agitator rotors and an interior wall of a process vessel to facilitate uniform movement of the solid mixture through the process vessel and to maximize a flow of solid components in the desired direction through the process vessel.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 1B is a side view of the agitator rotor of FIG. 1A. FIGS. 1C and 1D are end views of the agitator rotor of FIG. 1A.

FIGS. 2A-2C are side views of the agitator rotor of FIG. 1A.

DETAILED DESCRIPTION

This specification describes agitator rotors and agitator systems for mixing quantities of solid components, such as a feedstock material including solid wastes from a municipal waste stream. In particular, the agitator rotors and agitator systems can be used to mix a variety of solid wastes in a process vessel. The agitator rotors and agitator systems demonstrate a desired strength and durability for mixing a large quantity of solid components, including a large quantity of non-uniform solid components having an unpredictable weight distribution. The agitator rotors and agitator systems can facilitate thorough mixing of solids as well as movement of the solid mixture through a process vessel in a desired direction. The agitator rotors can be sized and shaped and the agitator systems can be implemented to minimize a distance between a surface of the agitator rotors and an interior wall of a process vessel to facilitate uniform movement of the solid mixture through the process vessel and to maximize a flow of solid components in the desired direction through the process vessel.

Figure 1A:
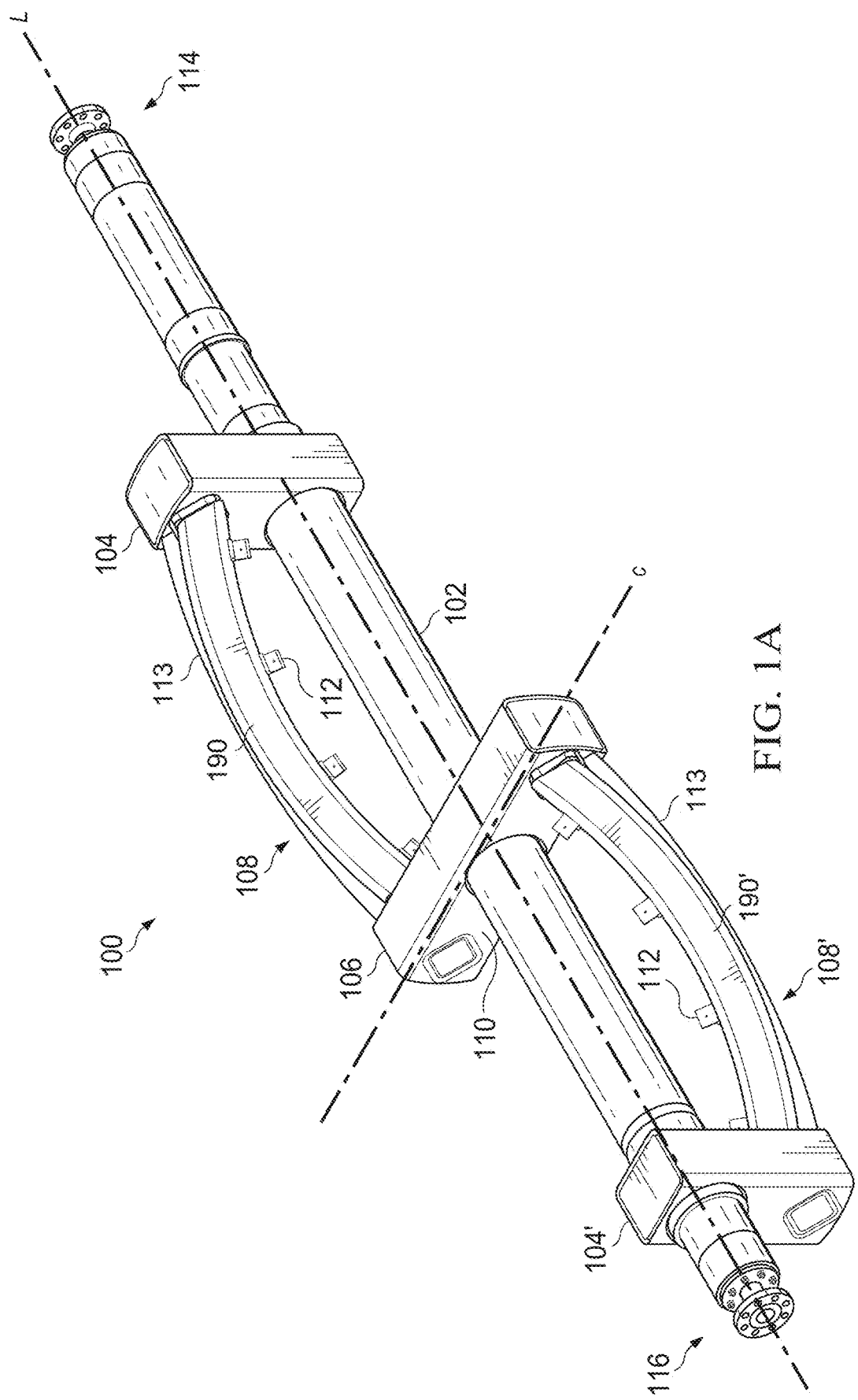
FIG. 1A is a perspective view of an example of an agitator rotor.

FIGS. 1A-1D depict an example of an agitator rotor. As shown in FIG. 1A, agitator rotor 100 includes central shaft 102, rails 104, 104', and 106 coupled to and extending radially from the shaft, and rods 108, 108' coupled to the rails. In some embodiments, an agitator rotor includes a shaft, two rails, and a single rod coupled to the two rails. In other embodiments, an agitator rotor includes a shaft, more than three rails, and more than three rods, with each rod coupled to at least two of the rails. Dimensions of agitator rotor 100 can be tailored to any particular application. In one example, a length of central shaft 102 is in a range of 2 to 4 meters. Suitable materials for central shaft 102, rails 104, 104', and 106, and rods 108, 108' include metals such as carbon steel and stainless steel.

Central shaft 102 defines a longitudinal axis 1 through a lengthwise center of the shaft. As depicted in FIG. 1A, central shaft 102 is cylindrical. In other embodiments, the shaft can have a polygonal cross-sectional shape or other arcuate cross-sectional shape. In some cases, central shaft 102 is solid. However, in some cases, at least a portion of the central shaft 102 is hollow. A component is considered hollow if it has a cavity that fluid (e.g., gas or liquid) can enter or exit. In some cases, the cavity has a single opening at an external surface of the component. In some cases, the cavity has multiple openings at an external surface of the component. In some cases, an entire length of the central shaft 102 is hollow. In one example, the central shaft 102 is tubular.

Each of rails 104, 104', and 106 defines a central axis c that intersects the longitudinal axis of the shaft. As depicted in FIG. 1A, each rail 104, 104', and 106 defines a central axis perpendicular to the longitudinal axis of the shaft. In other embodiments, each rail 104, 104', and 106 defines a central axis that forms an oblique angle with the longitudinal axis of the shaft. As depicted in FIG. 1A, rails 104, 104', and 106 have a rectangular cross section in a plane parallel to the longitudinal axis of the shaft. In other embodiments, rails 104, 104', and 106 have an arcuate or other polygonal cross section in a plane parallel to the longitudinal axis of the shaft. Rails 104, 104', and 106 may be solid or at least partially hollow. Rails 104, 104', and 106 are separated from each other along a length of the shaft. Each rail includes a surface 110 extending from the shaft and defining a non-zero angle with respect to the longitudinal axis of the shaft. As depicted in FIG. 1A, surface 110 is perpendicular to the longitudinal axis of the shaft. In other embodiments, surface 110 forms an oblique angle with the longitudinal axis of the shaft.

Each of rods 108, 108' has a first end coupled to rail 104, 104', respectively, and a second end coupled to rail 106. A cross section of each rod 108, 108' perpendicular to the longitudinal axis of the shaft (e.g., at the location where the rod couples to the rail) is typically polygonal (e.g., rectangular, hexagonal, octagonal). Corners of the polygon may be rounded. Rods 108, 108' may be solid or at least partially hollow. As depicted in FIGS. 1C-1D and 5C, a cross section of each rod 108, 108' is square. Rods 108, 108' can be solid or at least partially hollow. Rods 108, 108' may be coated with a composition selected to reduce physical abrasion and thermal damage. In some cases, rods 108, 108' are coated with a material selected to reduce adhesion of solid components with the rods. Examples of suitable coating materials include corrosion-inhibiting silicone-based coatings (e.g., a modified silicone co-polymer) for materials including steel, stainless steel, and carbon steel that are heat resistant up to at least 300° C. or 350° C. In some embodiments, rods 108, 108' are straight rods. In some embodiments, rods 108, 108' are curved rods. In some embodiments, rod 108 is a straight rod, and rod 108' is a curved rod. In some embodiments, rod 108 is a curved rod, and rod 108' is a straight rod.

In some embodiments, fins 112 are coupled to rods 108, 108'. In some embodiments, fins 112 are attached to an outer surface of the rods 108, 108'. In some embodiments, the fins 112 are inserted within grooves defined by rods 108, 108'. Fins 112 extend radially from an outer surface of rods 108, 108' and along at least a portion of the length of the rods 108, 108'. In some embodiments, fins 112 protrude from the rods 108, 108' by at least 2 centimeters. In some embodiments, the fin 112 is an elongate fin. As depicted in FIG. 1A, fins 112 extend radially inwardly toward the longitudinal axis l. In some embodiments, fins 112 extend tangentially away from the rods with respect to the longitudinal axis l. In one example, fins 112 extend tangentially from the rods alongside walls 190, 190' of the rods 108, 108' in a same or opposite direction of rotation of the agitator rotor 100.

In some embodiments, longitudinal fins 113 are coupled to rods 108, 108'. In some embodiments, longitudinal fins 113 are attached to an outer surface of the rods 108, 108'. Longitudinal fins 113 extend radially from an outer surface of rods 108, 108' and along at least a portion of the longitudinal length of the rods 108, 108'. In some embodiments, longitudinal fins 113 protrude from the rods 108, 108' by at least 2 centimeters. In some embodiments, the longitudinal fins 113 are elongate fins. As depicted in FIG. 1A, longitudinal fins 113 extend radially outwardly away from the longitudinal axis l. During operation as the agitator rotor 100 rotates within the process vessel, the longitudinal fins 113 can prevent solid material from remaining on an inner surface of the process vessel, so that the solid material continues to be turbulently mixed within the process vessel.

FIG. 1B is a side view of agitator rotor 100. As shown in FIG. 1B, rails 104 extend in opposite directions from each other, and perpendicular to rail 106. Rod 108 extends between rails 104 and 106, and rod 108' extends between rails 104' and 106. In some embodiments, rods 108, 108' are curved in more than one plane, such that no planar surface extends from a first end to a second end of the rods.

FIGS. 1C and 1D are end views of agitator rotor 100 from drive end 114 and extruder end 116, respectively. A projection of rods 108, 108' in a plane perpendicular to the longitudinal axis of the shaft defines a minor arc between a central axis c of rails 104, 104' and central axis c of rail 106 about a portion of the shaft. As depicted in FIGS. 1C and 1D, the minor arc is about 90°. In some embodiments, the minor arc is in a range of from about 30° to about 140°. In some embodiments, the minor arc is in a range of from about 60° to about 120°. In some embodiments, the minor arc is in a range of from about 70° to about 110°. In some embodiments, the minor arc is in a range of from about 80° to about 100°. In some embodiments, the minor arc is in a range of from about 85° to about 95°. As depicted in FIGS. 1C and 1D, rods 108, 108' have a square cross section, with the corners of the square being rounded, and rails 104, 104', 106 have a rectangular cross section, with the corners of the rectangle being rounded. A first end of rod 108 is coupled to rail 104, and a second end of rod 108 is coupled to rail 106; a first end of rod 108' is coupled to rail 104', and a second end of rod 108' is coupled to rail 106. Thus, in some embodiments, rails 108, 108' are curved in more than one plane, in a concave fashion toward the longitudinal axis of the shaft, forming a portion of a spiral around the longitudinal axis. The first ends of rods 108, 108' are coupled to rails 104, 104', respectively, on opposing ends of a perimeter of shaft 102 in a plane perpendicular to the longitudinal axis of the shaft. The second ends of rods 108, 108' are coupled to opposite ends of rail 106, on the opposing sides of a perimeter (i.e., circumference) of shaft 102 in a plane perpendicular to the longitudinal axis of the shaft.

Figure 2C:
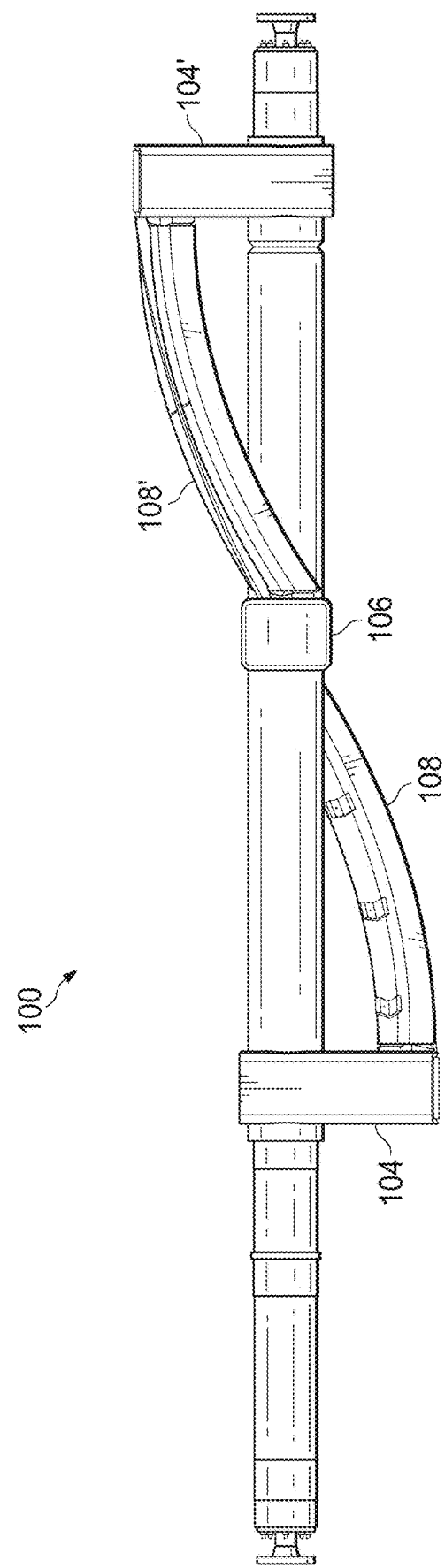

FIGS. 2A-2C are side views of agitator rotor 100. In FIG. 2A, a central axis of rails 104, 104' is in the plane of the drawing and a central axis of rail 106 is perpendicular to the central axis of rails 104, 104'. In FIG. 2B, agitator rotor 100 has been rotated 90° about the longitudinal axis of the shaft with respect to FIG. 2A, such that a central axis of rail 106 is in the plane of the drawing and a central axis of rails 104, 104' is perpendicular to the central axis of rail 106. In FIG. 2C, agitator rotor 100 has been rotated 180° about the longitudinal axis of the shaft with respect to FIG. 2A, such that a central axis of rails 104, 104' is in a plane of the drawing and a central axis of rail 106 is perpendicular to the central axes of rails 104, 104'.

Figure 2E:
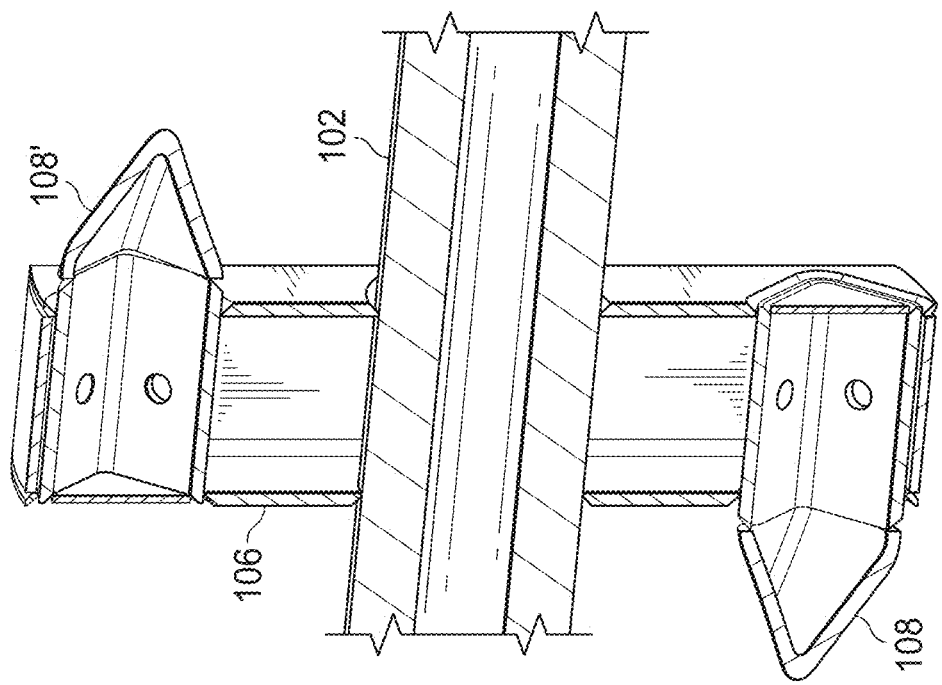
FIGS. 2D and 2E are cross-sectional views of a portion of the agitator rotor of FIG. 1A.
Figure 2D:
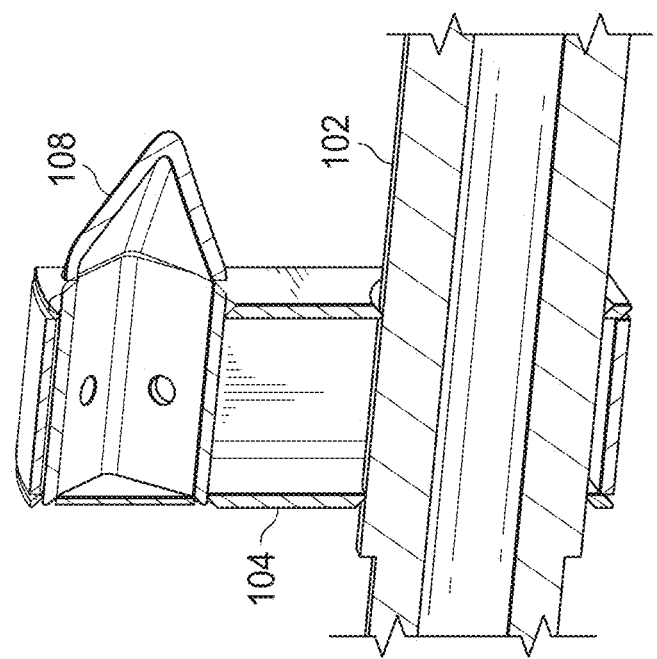

FIGS. 2D and 2E are cross-sectional views of portions of agitator rotor 100. FIG. 2D is a cross-sectional view of a portion of central shaft 102, rail 104, and rod 108 in the plane of the page in FIG. 2A. As depicted in FIG. 2D, rod 108 has an open, square-shaped cross section and is coupled (e.g., welded) to rail 104. FIG. 2E is a cross-sectional view of a portion of central shaft 102, rail 106, and rods 108, 108' of agitator rotor 100 in FIG. 2A turned 270° clockwise at extruder end 116 about the longitudinal axis of the agitator rotor (not shown).

Figure 3A:
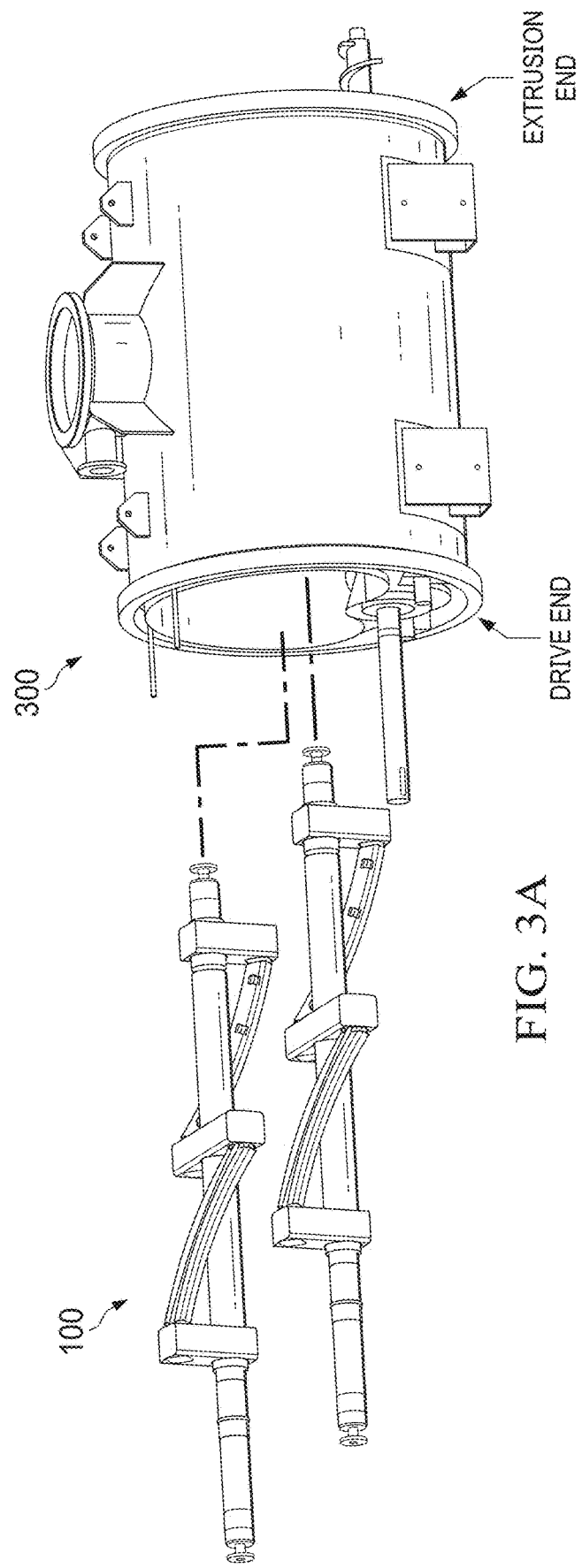
FIG. 3A is an exploded view of an agitator system including the agitator rotors of FIGS. 1A-1D.
Figure 3B:
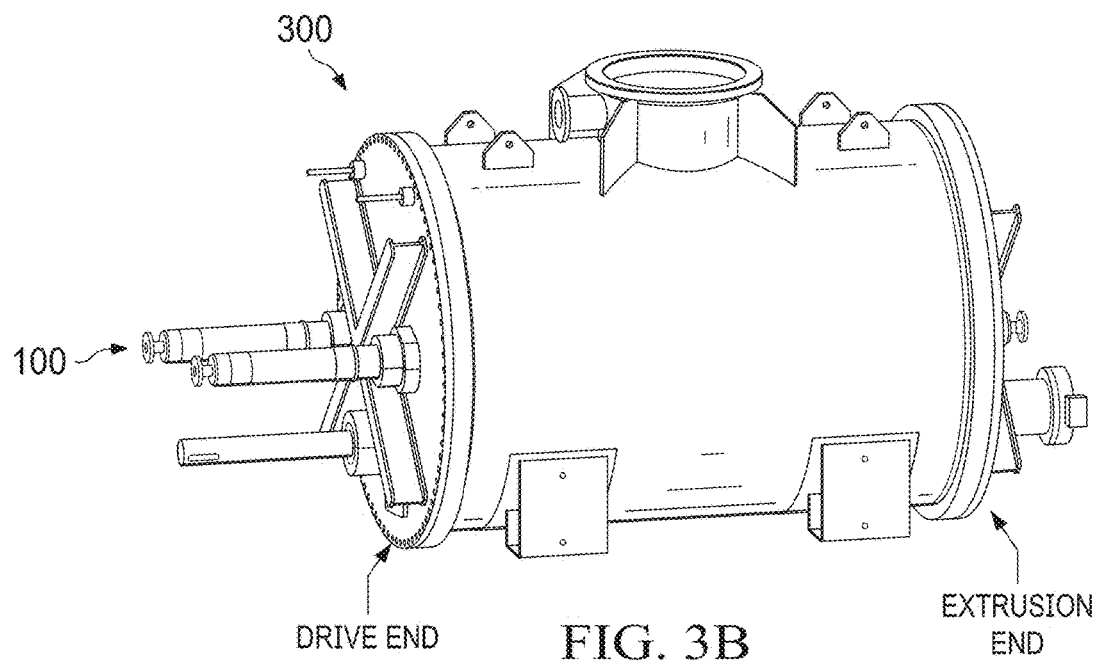
FIG. 3B is a view of an assembled agitator system.
Figure 3C:
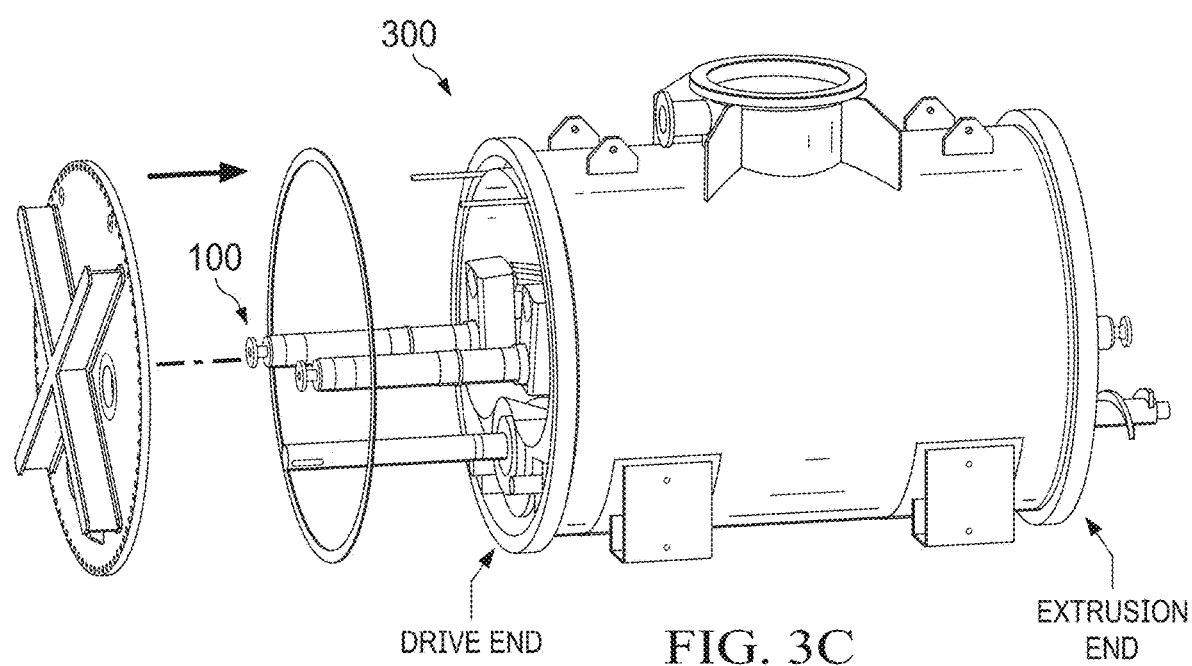
FIG. 3C shows an exploded view of a process vessel.
Figure 3D:
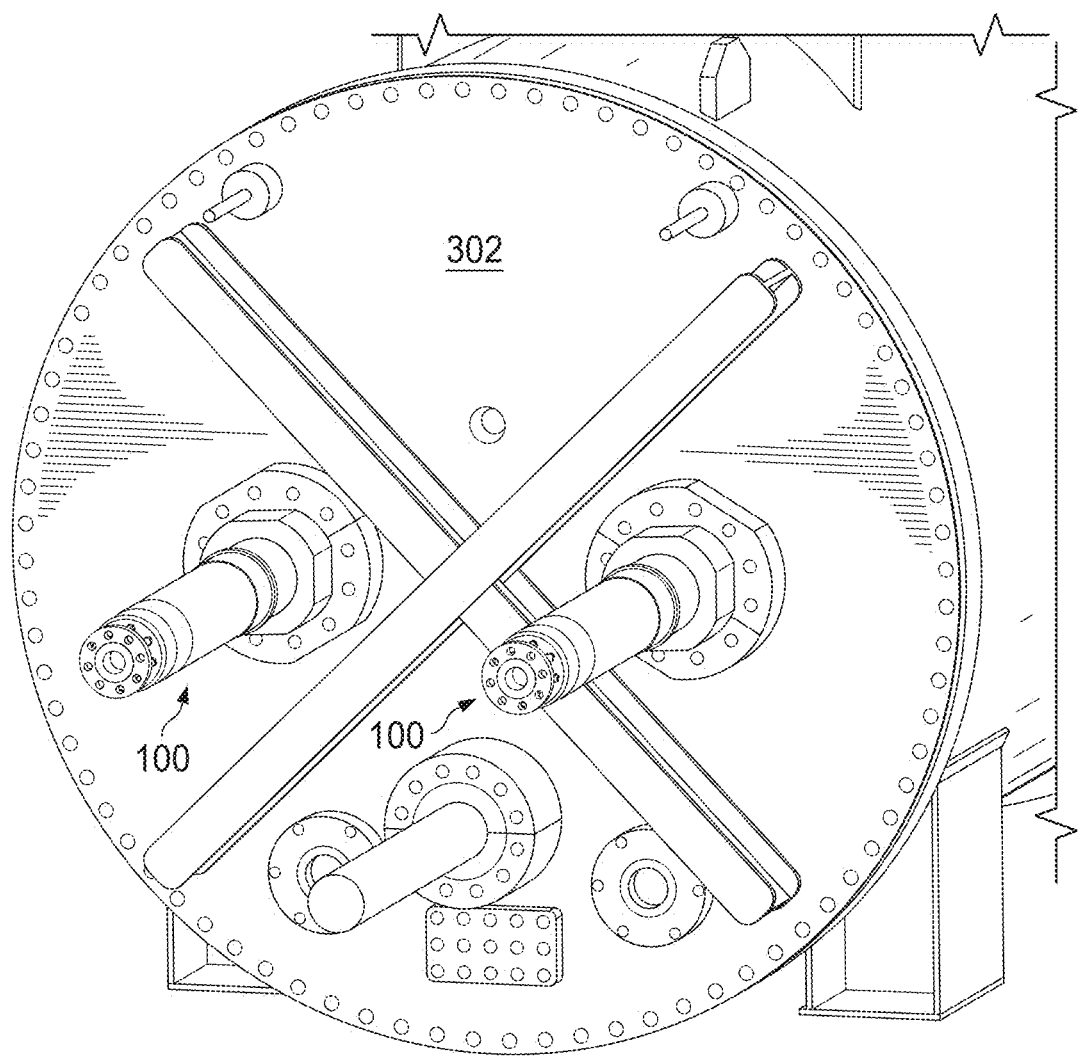
FIG. 3D shows an end of a process vessel.

FIG. 3A is an exploded view of process vessel 300 including an agitator system having agitator rotors 100 of FIGS. 1A-1D. As depicted in FIG. 3A, agitator rotors 100 are positioned such that at least the rails and the rod(s) of a first rotor are arranged in a cavity of process vessel 300. The shaft of the first rotor and the shaft of the second rotor are in a fixed spatial relationship in the cavity of process vessel 300. FIG. 3B depicts process vessel 300 with agitator rotors 100 positioned in the process vessel. Agitator rotors 100 are typically configured to rotate in opposite directions (e.g., clockwise and counter-clockwise) in a cavity of process vessel 300, with rails 106 of the agitator rotors 100 aligned in a plane perpendicular to the longitudinal axis of the shaft of the first rotor and the longitudinal axis of the shaft of the second rotor. In other embodiments, the agitator rotors 100 are configured to rotate in the same direction (e.g., both clockwise or both counter-clockwise) in the cavity of process vessel 300, with rails 106 of the agitator rotors 100 aligned in a plane perpendicular to the longitudinal axis of the shaft of the first rotor and the longitudinal axis of the shaft of the second rotor. FIG. 3C depicts process vessel 300 with at least a portion of agitator rotors 100 positioned inside the process vessel. FIG. 3D depicts end 302 of process vessel 300, with a shaft of agitator rotors 100 extending through a wall of the process vessel.

Figure 4:
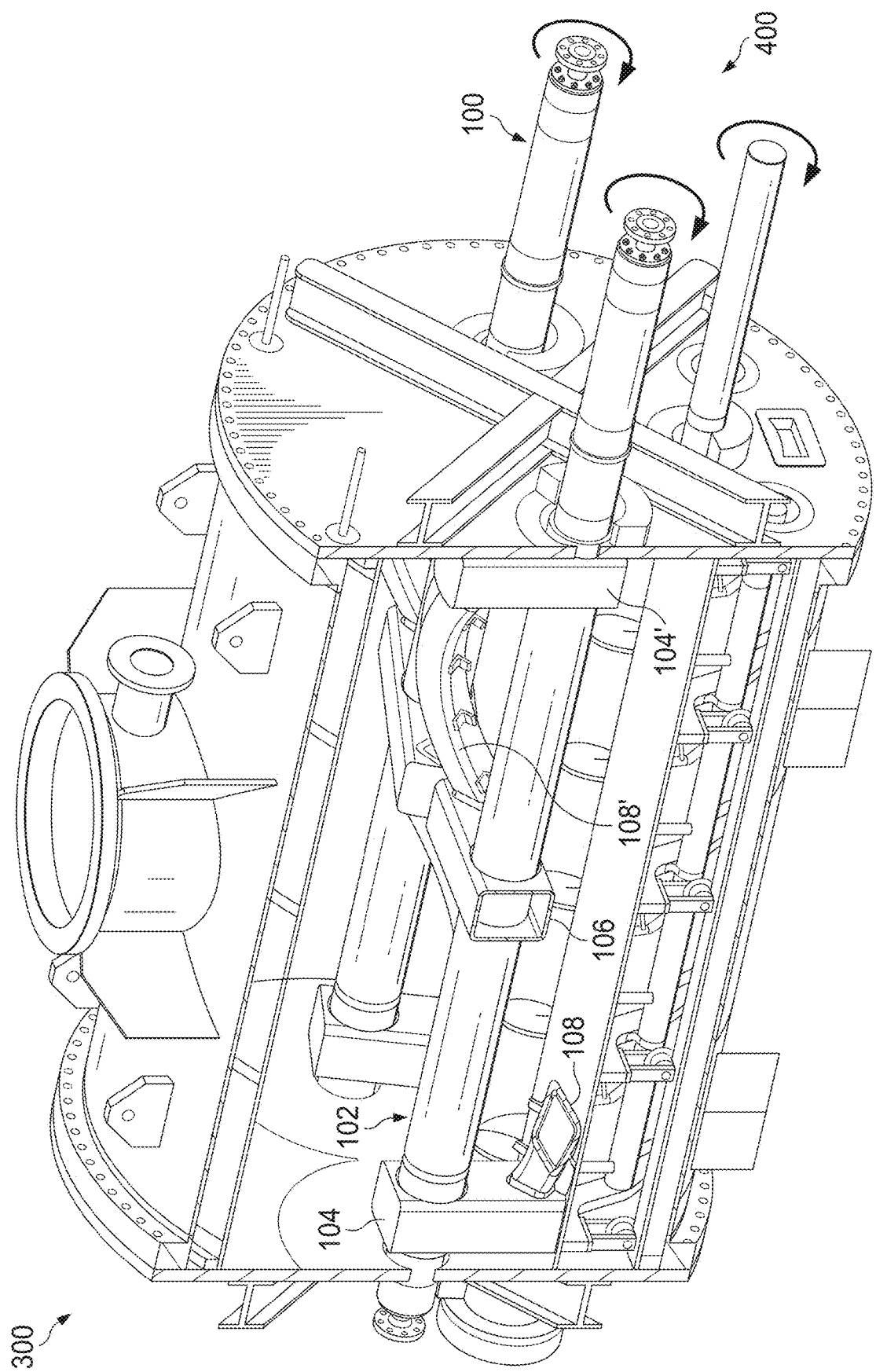
FIG. 4 is a cutaway view of a process vessel with the agitator rotors of FIGS. 1A-1D.

FIG. 4 is a cutaway view of process vessel 300, with agitator rotor system 400 including agitator rotors 100. As depicted in FIG. 4, rods 108, 108' of agitator rotors 100 are sized and arranged to achieve a specified clearance with respect to a surface of the process vessel defining the cavity. In some examples, the clearance is less than 2 cm, less than 1 cm, or less than 0.5 cm. The cross-sectional shape of rods 108, 108' is selected to maintain a minimized gap between the rods and the surface of the process vessel defining the cavity as the rods rotate in the cavity. The agitator rotors are configured to mix and advance solid components in the cavity from a first end of the process vessel (the drive end) to a second end of the process vessel (the extrusion end). The longitudinal axes of the agitator rotors are offset from a center of the cavity.

Figure 5A:
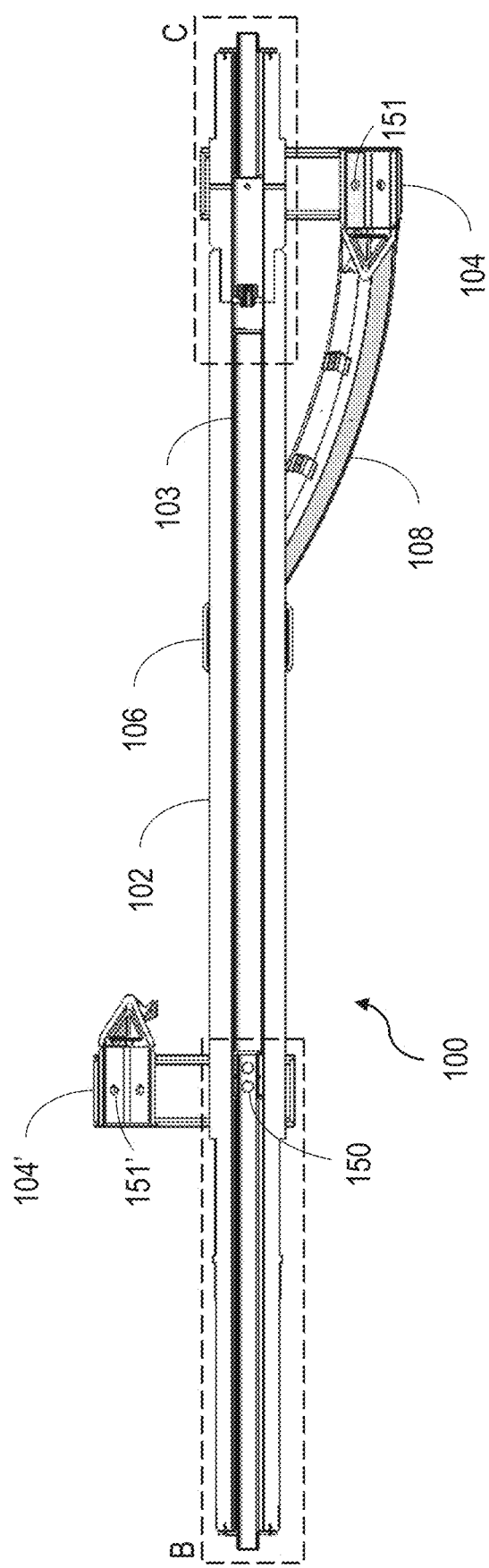
FIG. 5A is a cross-sectional view of a portion of the agitator rotor of FIG. 1A.

FIG. 5A is a cross-sectional view of a portion of the agitator rotor 100. As depicted in FIG. 5A, the central shaft 102 of the agitator rotor 100 is hollow, such that a heating medium (e.g., hot oil) can flow through the central shaft 102. In some embodiments, the central shaft 102 defines port(s) 150 for flowing the heating medium through other components of the agitator rotor 100, for example, to rails 104, 104', and 106. In some embodiments, the rails 104, 104' define ports 151, 151' for flowing the heating medium through the rods 108, 108'. Therefore, in some embodiments, the heating medium (e.g., hot oil) flows through the entire agitator rotor from a first end to a second, opposite end (i.e., through the central shaft 102, the rails 104, 104' and 106', and the rods 108, 108').

Figure 5B:
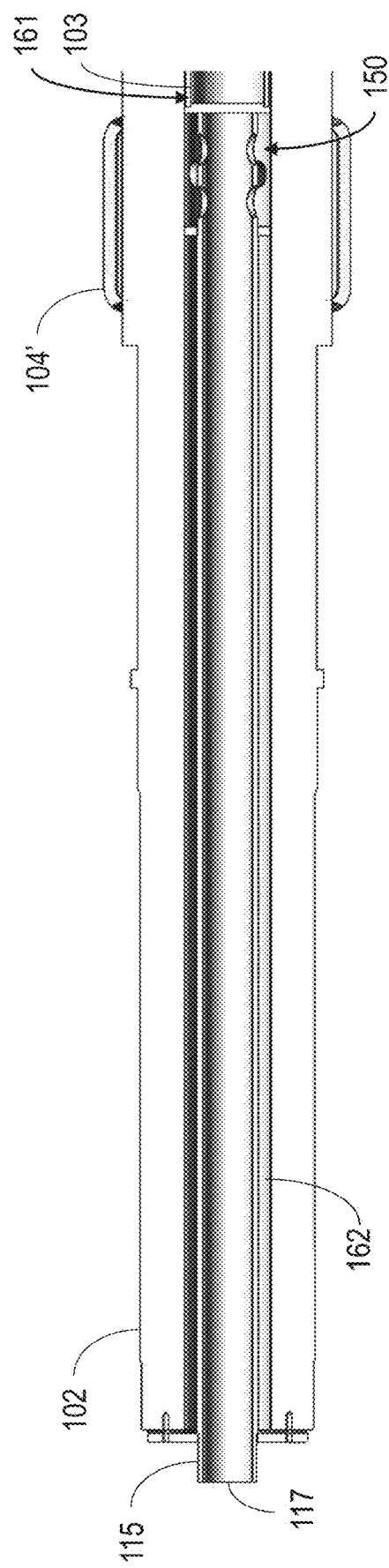
FIG. 5B is an enlarged image of an end portion (B) of FIG. 5A.
Figure 5C:
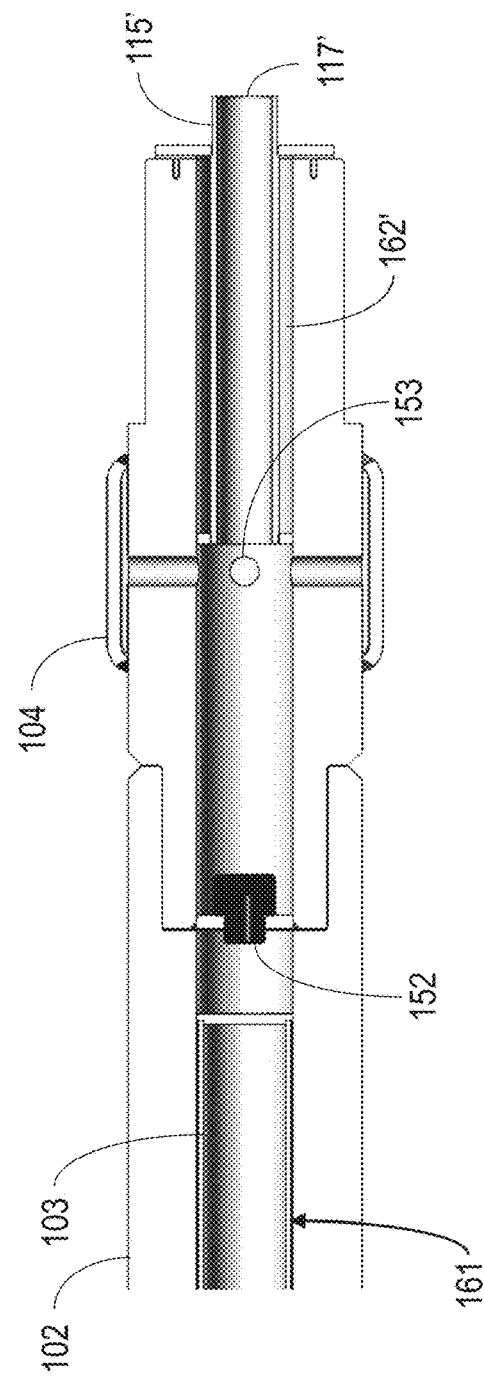
FIG. 5C is an enlarged image of an end portion (C) of FIG. 5A.

In some embodiments, the central shaft 102 includes an inner rod 103 that is disposed within an inner bore of the central shaft 102. In some cases, the inner rod 103 is solid. In some cases, as shown in FIG. 5B, the inner rod 103 is at least partially hollow. The void space between the inner rod 103 and the central shaft 102 defines an annulus through which the heating medium (e.g., hot oil) flows. The heating medium (e.g., hot oil) flowing through the annulus between the inner rod 103 and the central shaft 102 serves as an intermediate medium between the two components, which can increase a heat transfer coefficient, and in turn, improve heat transfer within the agitator rotor 100. This configuration of providing an annulus for flowing the heating medium (e.g., hot oil) can increase a velocity of the heating medium flowing through the annulus (by providing a smaller cross-sectional flow area) and can also provide increased surface area for improved heat transfer from the agitator rotor 100 to the solid components being mixed.

Figure 5D:
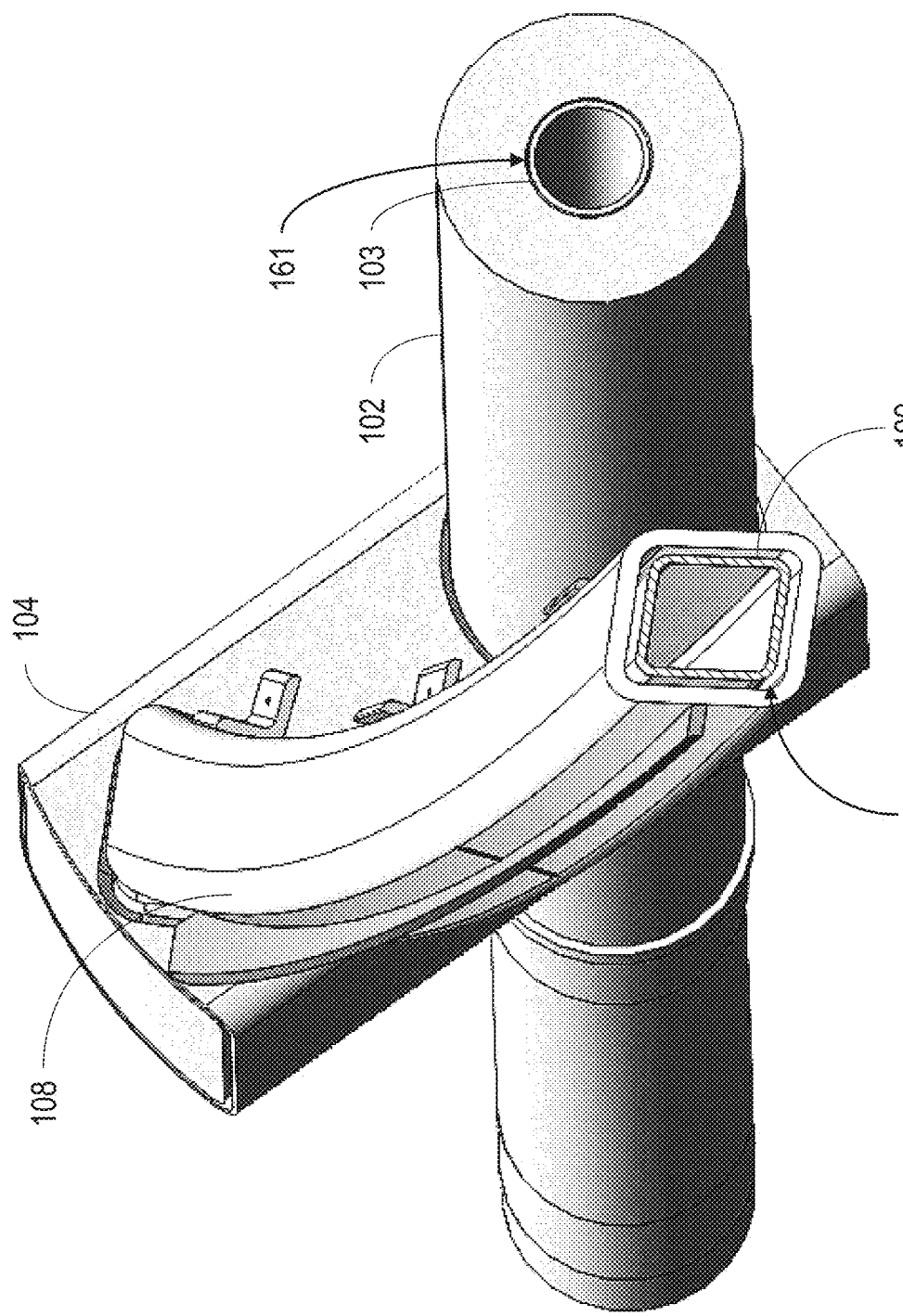
FIG. 5D is a cross-sectional view of a portion of the agitator rotor of FIG. 1A shown in a side perspective view.

FIG. 5B is a magnified view of a select portion (B) of the agitator rotor of FIG. 5A. As shown, the central shaft 102 includes a first inner shaft 115 that is disposed within an inner bore of the central shaft 102. The first inner shaft 115 is hollow, such that a heating medium (e.g., hot oil) can flow through the first inner shaft 115. In some embodiments, the first inner shaft 115 defines port(s), such that the heating medium can flow within the hollow of the first inner shaft 115. For example, the hollow of the first inner shaft 115 can be filled with the heating medium (e.g., hot oil). The heating medium (e.g., hot oil) can flow into the agitator rotor 100 in a bore 117 of the first inner shaft 115. The heating medium (e.g., hot oil) can flow from within the first inner shaft 115 into the annulus 161 between the inner rod 103 and the central shaft 102 (a cross-sectional view of the annulus 161 is also shown in FIG. 5D). The heating medium (e.g., hot oil) can also flow from within the first inner shaft 115 through the port(s) 150) into the rail 104'. In some embodiments, there is a void space between the first inner shaft 115 and the central shaft 105 that defines an annulus 162. In some embodiments, the annulus 162 between the first inner shaft 115 and the central shaft 105 is filled with a static fluid (e.g., air or oil). In such embodiments, the static fluid can provide thermal insulation to decrease heat transfer from the heating medium flowing within the first inner shaft 115 radially outward to the central shaft 105. This configuration of providing an annulus filled with a static fluid can protect nearby components that may be sensitive to the high temperatures (for example, the temperature of the heating medium).

FIG. 5C is a magnified view of a select portion (C) of the agitator rotor of FIG. 5A. The heating medium (e.g., hot oil) can flow from the annulus 161 between the inner rod 103 and the central shaft 102 through an orifice 152. The heating medium (e.g., hot oil) can also flow from the rail 104 through port(s) 153. The agitator rotor can include an orifice 152 sized and shaped to control a ratio of: (i) the heating medium (e.g., hot oil) that flows within the annulus between the inner rod 103 and the central shaft 102; and (ii) the heating medium that flows through the rails 104, 104', and 106 and the rods 108, 108'. The heating medium (e.g., hot oil) can then flow into a second inner shaft 115' that is disposed within the inner bore of the central shaft 102. Like the first inner shaft 115, the second inner shaft 115' is hollow, such that the heating medium (e.g., hot oil) can flow through the second inner shaft 115'. For example, the hollow of the second inner shaft 115' can be filled with the heating medium (e.g., hot oil). The heating medium (e.g., hot oil) can flow out of the agitator rotor 100 from a bore 117' of the second inner shaft 115'. In some embodiments, there is a void space between the second inner shaft 115' and the central shaft 105 that defines an annulus 162'. In some embodiments, the annulus 162' between the second inner shaft 115' and the central shaft 105 is filled with a static fluid (e.g., air or oil). In such embodiments, the static fluid can provide thermal insulation to decrease heat transfer from the heating medium flowing within the second inner shaft 115' radially outward to the central shaft 105.

FIG. 5D is a cross-sectional view of a portion of the agitator rotor 100. As shown, the rod 108 is hollow, such that the heating medium can flow through a hollow cavity of the rod 108. The rod 108 includes an inner rod 109 that is disposed within an inner bore of the rod 108. The void space between the inner rod 109 and the rod 108 defines an annulus 160 through which the heating medium flows. The annulus 160 between the inner rod 109 and the rod 108 can increase a heat transfer coefficient, and in turn, improve heat transfer during vessel processing, similar to the thin film formed between the inner rod 103 and the central shaft 102. In some embodiments, the heating medium (e.g., hot oil) can also flow within the inner rod 109. For example, the inner rod 109 can be filled with a heating medium (e.g., hot oil). The inner rod 109 disposed within the rod 108 can also be implemented for the rod 108'. For example, the rod 108' can also include an inner rod (not shown) disposed within the rod 108'.

Figure 6:
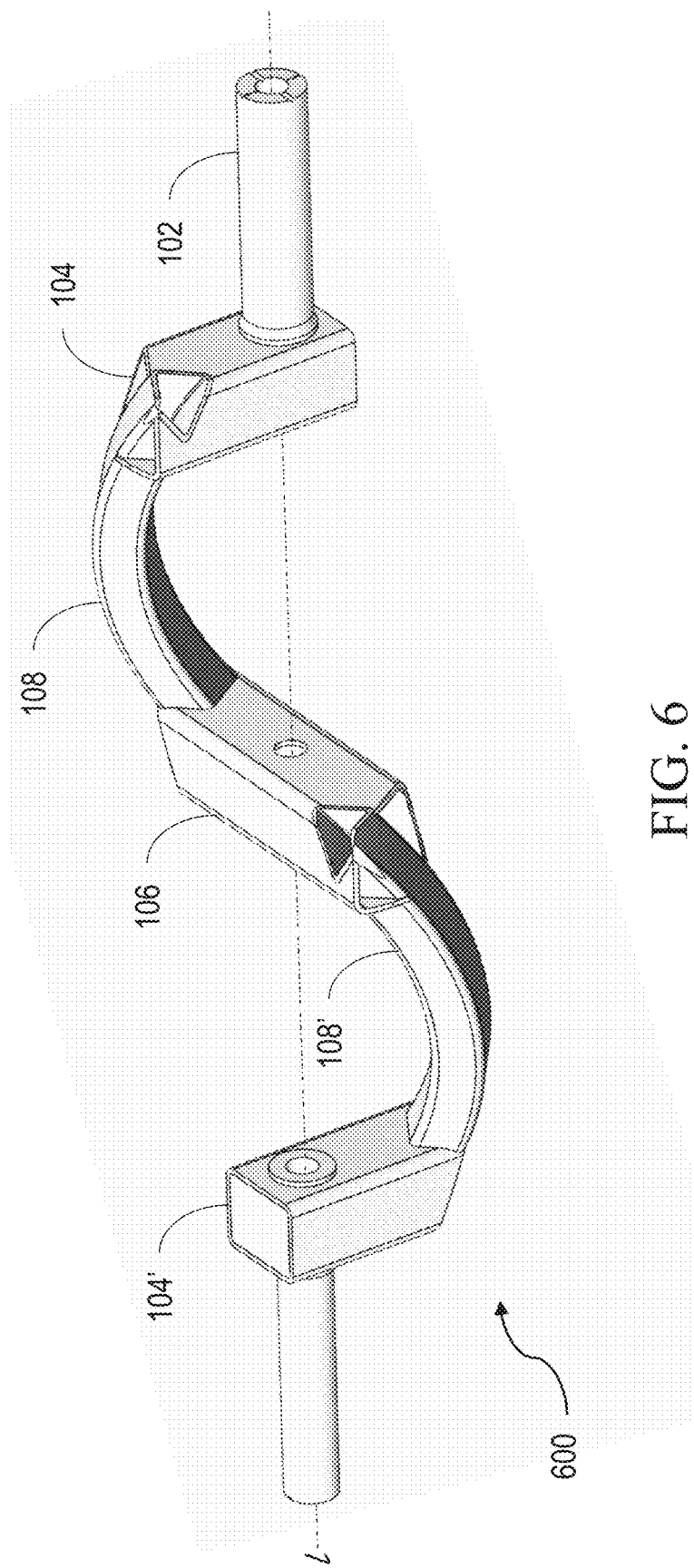
FIG. 6 is a perspective view of an example of an agitator rotor.

FIG. 6 depicts an example of an agitator rotor. In some cases, agitator rotor 600 of FIG. 6 is similar to the agitator rotor 100 shown in FIGS. 1A through 1D, except that it lacks a portion of the central shaft 102. As shown, in some embodiments, the central shaft 102 does not extend between the rails 104, 104'.

The agitator rotors and agitator systems described in this specification are not limited to mixing of solid waste for fuel compositions. For example, the agitator rotors and agitator systems may be used to produce other types of compositions from feedstock materials (e.g., a mixture of materials). In some embodiments, the process vessel is used to produce a desired composition (e.g., a uniformly mixed or blended solid composition) from feedstock materials (e.g., a mixture of different materials).

As used in this disclosure, the term "about" or "approximately" can allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A process vessel comprising an agitator rotor system comprising:
    a first rotor comprising:
        a first shaft defining a first longitudinal axis,
        first rails extending radially from and coupled to the first shaft, wherein the first rails are separated from each other along a first length of the first shaft and each of the first rails comprises a first surface defining a non-zero angle with respect to the first longitudinal axis of the first shaft, and
        a first rod comprising a first end coupled to a first one of the first rails and a second end coupled to a second one of the first rails, wherein a first projection of the first end and the second end of the first rod in a first plane perpendicular to the first longitudinal axis of the first shaft defines a first minor arc about a portion of the first shaft;

a third rod comprising a fifth end coupled to a third one of the first rails and a sixth end coupled to the second one of the first rails, wherein the second end of the first rod and the sixth end of the third rod are coupled to the second one of the first rails on opposing sides of a perimeter of the first shaft in a plane perpendicular to the first longitudinal axis of the first shaft;

a hollow inner rod disposed within at least a portion of the first rod, wherein a first void space between the inner rod and the first rod defines a first annulus; and a second inner rod disposed within the first shaft, the second inner rod extending across a portion of the first shaft between the first rails, wherein a second void space between the second inner rod and the first shaft defines a second annulus;

wherein the first annulus is configured to allow a first portion of a heating medium to flow therethrough and the second annulus is configured to allow a second portion of the heating medium to flow therethrough; and a second rotor comprising:

a second shaft defining a second longitudinal axis, second rails extending radially from and coupled to the second shaft, wherein the second rails are separated from each other along a second length of the second shaft and each of the second rails comprises a second surface defining a non-zero angle with respect to the second longitudinal axis of the second shaft, a second rod comprising a third end coupled to a first one of the second rails and a fourth end coupled to a second one of the second rails, wherein a second projection of the third end and the fourth end of the second rod in a second plane perpendicular to the second longitudinal axis of the second shaft defines a second minor arc about a portion of the second shaft, wherein the first rails and the first rod of the first rotor and the second rails and the second rod of the second rotor are arranged in a cavity in the process vessel, the first rotor configured to rotate about the first shaft defined by the first longitudinal axis of the first rotor, and the second rotor configured to rotate around the second shaft defined by the second longitudinal axis of the second rotor.

2. The process vessel of claim 1, wherein the first surface of each rail of the first rails is perpendicular to the first longitudinal axis of the first shaft.

3. The process vessel of claim 1, wherein each rail of the first rails defines a central axis perpendicular to the first longitudinal axis of the first shaft.

4. The process vessel of claim 3, wherein the central axis of the first one of the first rails is perpendicular to the central axis of the second one of the first rails.

5. The process vessel of claim 1, wherein the first rod is hollow.

6. The process vessel of claim 1, wherein the first rod is arcuate in shape.

7. The process vessel of claim 1, wherein the first end of the first rod and the fifth end of the third rod are coupled to the first one of the first rails and the third one of the first rails, respectively, on opposing sides of the perimeter of the first shaft in a plane perpendicular to the first longitudinal axis of the first shaft.

8. The process vessel of claim 1, wherein at least one of the first rod and the second rod is a curved rod.

9. The process vessel of claim 1, wherein the first rotor and the second rotor are configured to mix and advance solid components in the cavity from a first end of the process vessel to a second end of the process vessel.

10. The process vessel of claim 1, where the first rotor and the second rotor are offset from a center of the cavity.

11. The process vessel of claim 1, wherein each of the first rod and the second rod is hollow.

12. The process vessel of claim 6, wherein the second rod is arcuate in shape.

13. The process vessel of claim 1, wherein each of the first rod and the second rod is a curved rod.

14. The process vessel of claim 1, wherein a cross-section of each of the first rod and the second rod in a plane perpendicular to the longitudinal axis of their respective shafts is rectangular.

15. The process vessel of claim 1, the first shaft further comprising a first port configured to allow the heating medium to flow into the first shaft.

* * * * *